R. B. FULLER.
Strawberry-Vase.

No. 55,482.

Patented June 12, 1866.

UNITED STATES PATENT OFFICE.

REUBEN B. FULLER, OF NORWICH, CONNECTICUT.

IMPROVED VASE FOR CULTIVATING STRAWBERRIES.

Specification forming part of Letters Patent No. 55,482, dated June 12, 1866.

*To all whom it may concern:*

Be it known that I, REUBEN B. FULLER, of Norwich, New London county, State of Connecticut, have invented a new and useful Improvement in the Raising or Cultivation of Strawberries and other Plants and Vines; and I do hereby declare that the following is a full, clear, and exact description thereof, which will enable others skilled in the art to make and use the same, reference being had to the accompanying drawings, forming part of this specification.

The object of the present invention is to improve the cultivation and raising of strawberries and other plants and vines; and it consists in the use of a vase made of earthen or pottery ware or other suitable material, and of a shape and in such a manner as will be now described, whereby the desired object is secured, reference being had to the accompanying plate of drawings, in which—

Figure 1:
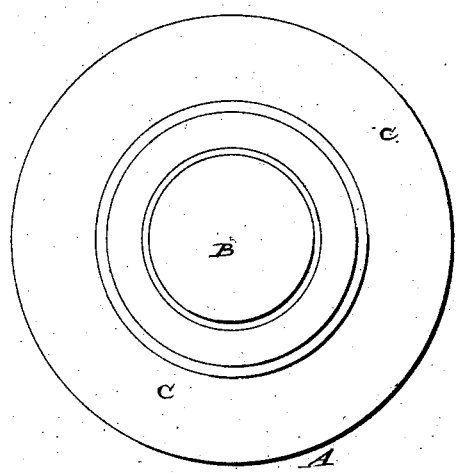
Figure 2:
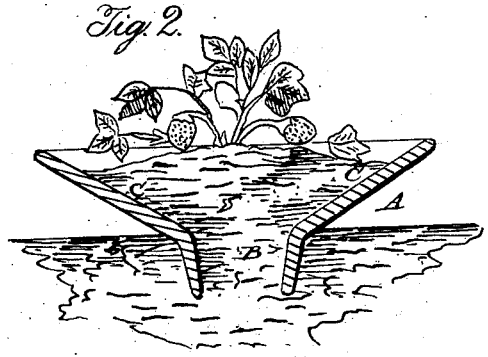

Figure 1 is a plan or top view of the vase; Fig. 2, a central vertical section of the same, showing its application to the cultivation of the strawberry plant; and Fig. 3, a similar view to Fig. 2, but in connection with a suitable pot or vessel to receive the plant, whereby the vase is adapted for use in a house or apartment of the same.

Similar letters of reference indicate like parts.

A in the drawings represents the vase, made of earthen or pottery ware or other suitable material and it consists of a short spout or tube, B, the upper end of which is provided with a rim or outward-flaring or inclined side, C, extending entirely around the same. This vase, when to be used in a strawberry-bed, for instance, is inserted by its tube or spout B in the ground around such strawberry plant or plants as may be desired, and to which it may be applicable, when, by the flaring side or rim of the vase, the rains and dews falling and gathered upon the vase are thus conveyed directly to the roots of the plant or plants, thereby causing the fruit to become riper much sooner or earlier, the vase also serving to protect the fruit from the dirt, as well as to greatly protect the plant from weeds, worms, and other insects, and, when it (the vase) is made of earthen or pottery ware, also imparting a great amount of heat and warmth from the rays of the sun to the roots of the plants, as is obvious without any further explanation.

When the vase having the form above described is used for vines and other running plants the vines can be trimmed close to the rim or edge of the vase, thereby greatly improving the cultivation and growth of the vines, as well as saving much labor and expense.

Figure 3:
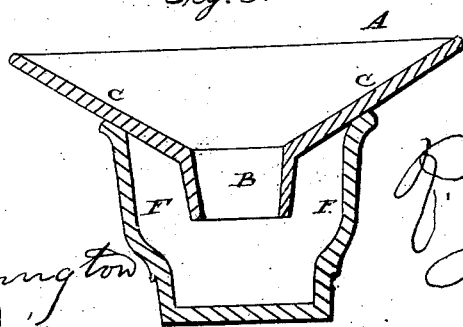

In Fig. 3 a pot or vessel, F, is shown in connection with the vase A, the object of the vessel F being to adapt the vase to the cultivation of strawberries and other plants and vines indoors.

I claim as new and desire to secure by Letters Patent—

1. The vase A, made substantially as herein described, and for the purposes specified.

2. In combination with the above, the use of the vessel or pot F or its equivalent, as and for the purpose described.

REUBEN B. FULLER.

Witnesses:
E. F. ROGERS,
WM. M. WILLIAMS.